Sept. 7, 1965             W. NYC             3,204,690

WINDOW COVERING ACTUATOR

Filed March 22, 1963                  6 Sheets-Sheet 1

INVENTOR.
Wladimir Nyc
BY *Lothrop & West*
*Attorneys*

Sept. 7, 1965 W. NYC 3,204,690
WINDOW COVERING ACTUATOR
Filed March 22, 1963 6 Sheets-Sheet 2
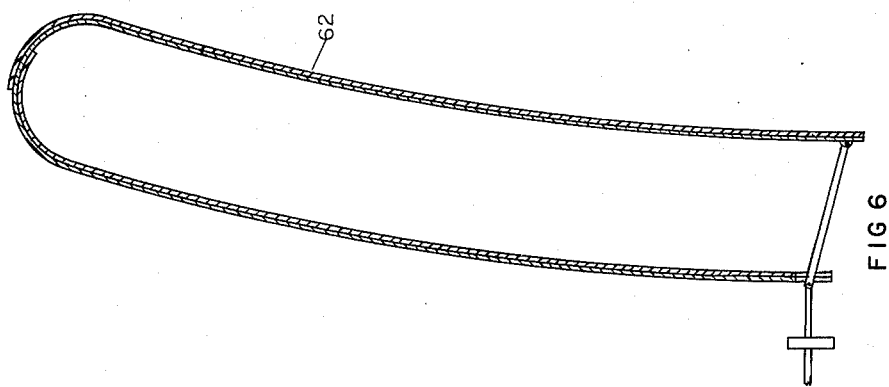
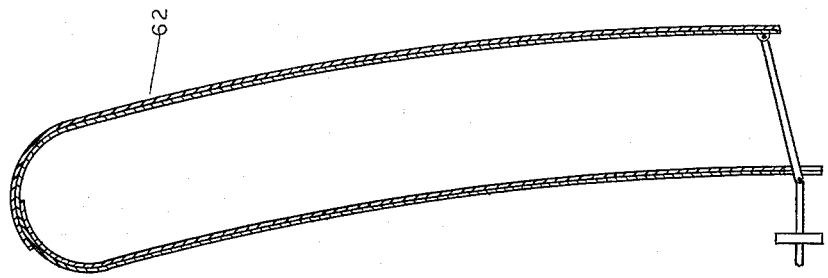
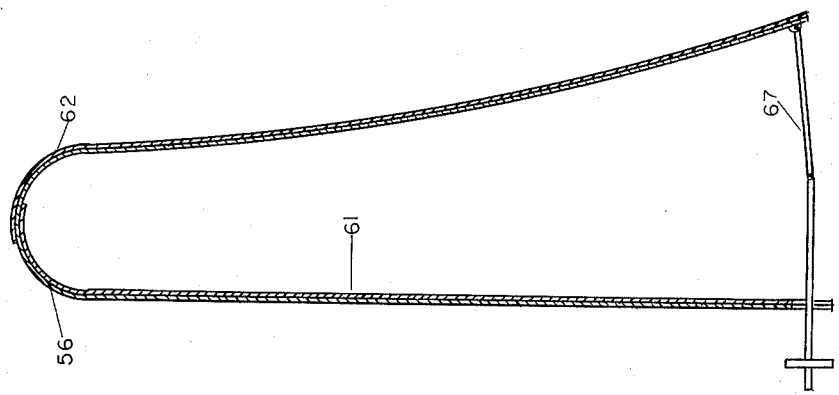
INVENTOR.
Wladimir Nyc
BY Lothrop & West
Attorneys

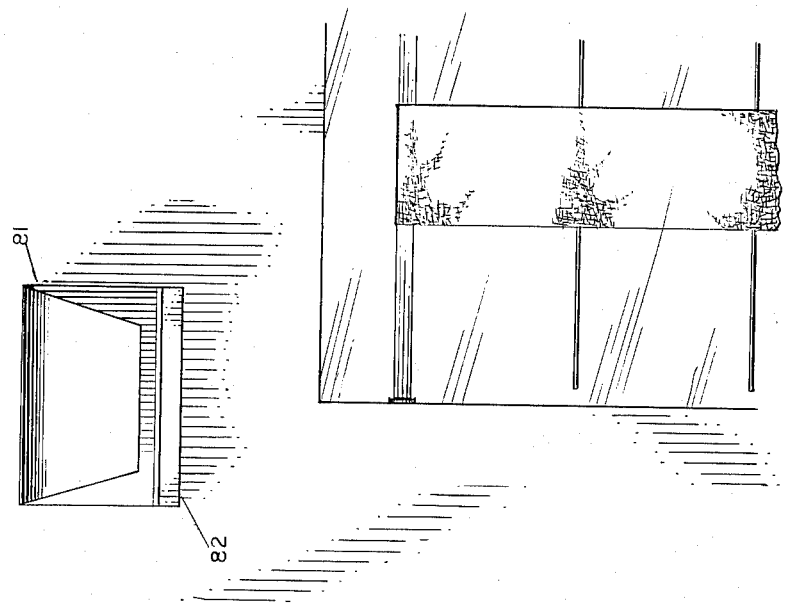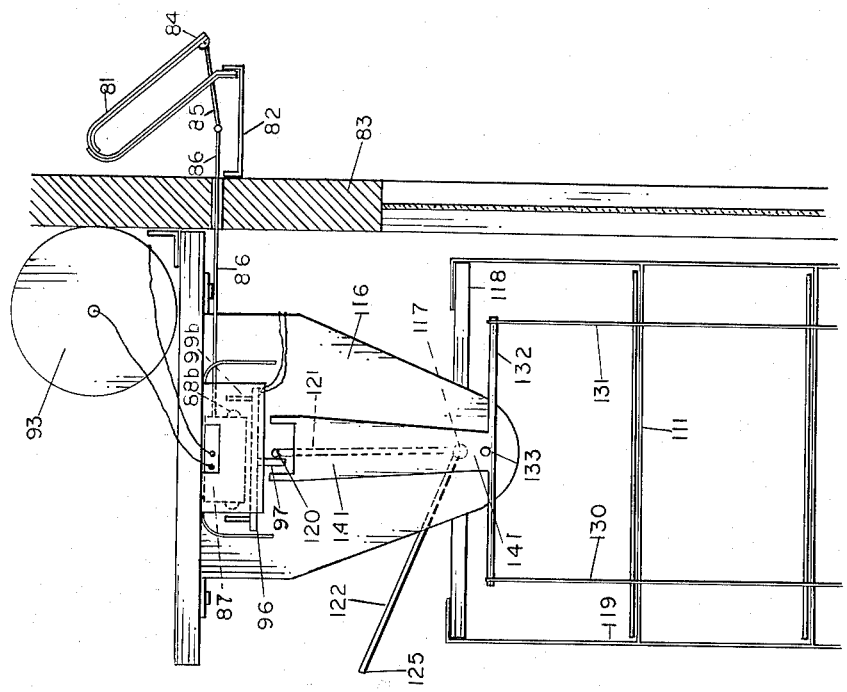

Sept. 7, 1965

W. NYC 3,204,690

WINDOW COVERING ACTUATOR

Filed March 22, 1963

INVENTOR.
Wladimir Nyc

BY *Lothrop & West*
*Attorneys*

Sept. 7, 1965  W. NYC  3,204,690
WINDOW COVERING ACTUATOR
Filed March 22, 1963  6 Sheets-Sheet 5

INVENTOR.
Wladimir Nyc
BY Lothrop & West
Attorneys

Sept. 7, 1965                W. NYC                3,204,690
WINDOW COVERING ACTUATOR
Filed March 22, 1963                6 Sheets-Sheet 6
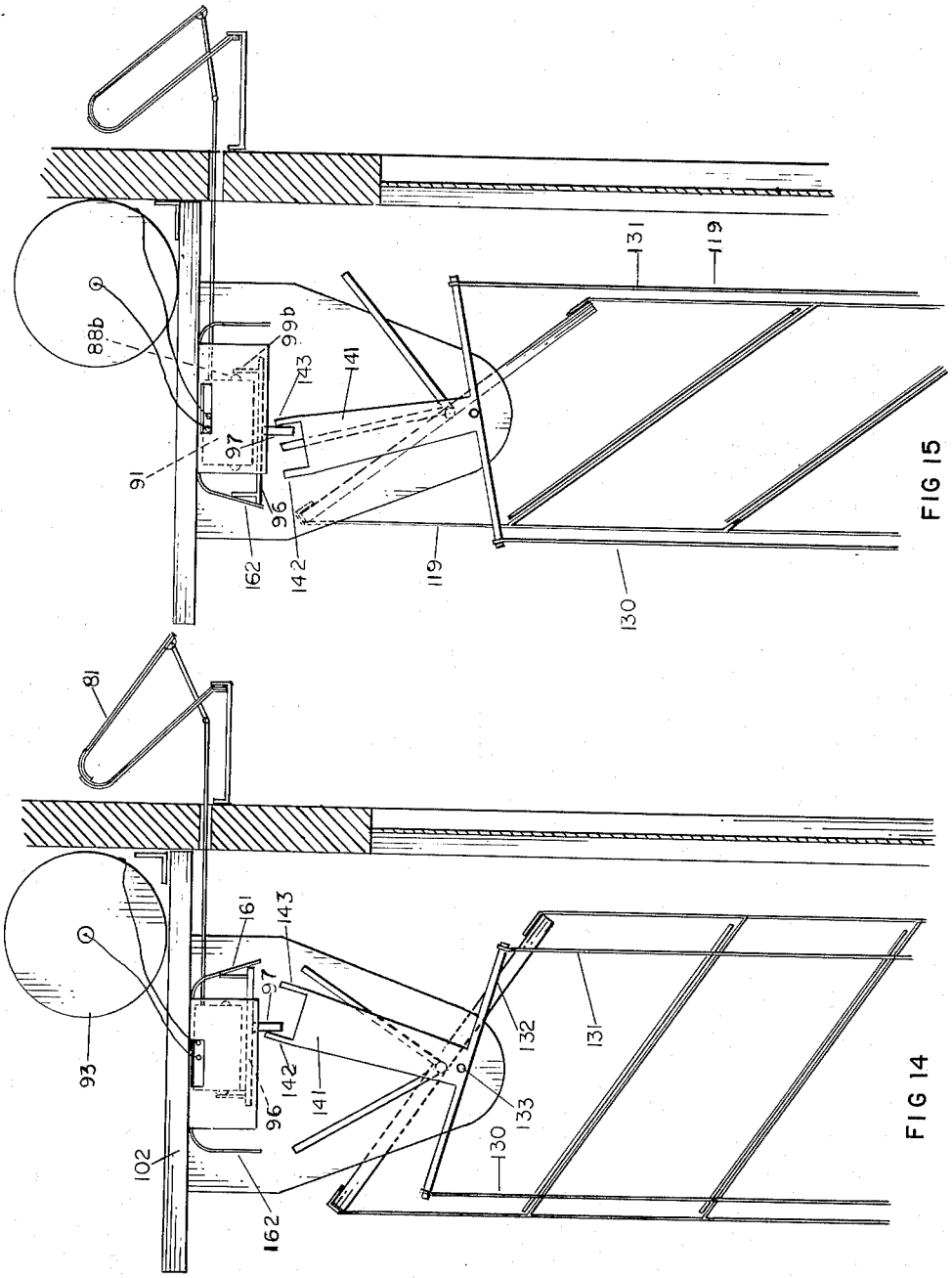
INVENTOR.
Wladimir Nyc United States Patent Office 3,204,690
Patented Sept. 7, 1965

3,204,690
WINDOW COVERING ACTUATOR
Wladimir Nyc, 3125 U St., Sacramento, Calif.
Filed Mar. 22, 1963, Ser. No. 267,200
5 Claims. (Cl. 160—176)

The invention relates to devices for closing and opening window coverings, such as Venetian blinds and draw drapes, and, more particularly to devices of this nature which are responsive to radiant energy such as sunlight.

Automatic drawing of blinds and drapes is a long and well-established concept, there being many commercially available items providing the convenience of automatically opening and closing window coverings at suitable times. So far as is known, however, such devices have heretofore utilized clock mechanisms or other relatively expensive and complex structures which require continuous re-setting throughout the year to conform to sunlight hours.

It is therefore an object of the invention to provide a window covering actuator which is substantially foolproof and which is inexpensive, yet reliable and longlived.

It is yet another object of the invention to provide an actuator the operation of which is substantially independent of the ambient air temperature.

It is a further object of the invention to provide a generally improved window covering actuator.

Other objects, together with the foregoing, are attained in the embodiments described in the following description and shown in the accompanying drawings in which:

FIG. 4 is a fragmentary section of the bimetallic plate showing the convguration of the plate when exposed to sunlight and with an average ambient air temperature;

FIG. 5 is comparable to that of FIG. 4 but without any sunlight on the plate and with cold air conditions;

FIG. 6 is comparable to that of FIG. 5, without any sunlight but under hot conditions of air temperature;

FIG. 7 is a fragmentary sectional view of a variant form of device utilizing electrical energy, the plane of the section being indicated by the line 7—7 in FIG. 8;

FIG. 8 is a fragmentary front elevational view of the FIG. 7 form of device;

FIG. 14 is a view comparable to FIG. 11 but showing the slats in open position; and FIG. 15 is a view corresponding to FIG. 7 but with the slats in tilted position.

While the devices of the invention are susceptible of numerous physical embodiments, depending on the environment and requirements of use, substantial numbers of the herein shown and described embodiments have been made, tested and used, and all have performed in an entirely satisfactory manner.

Figure 1:
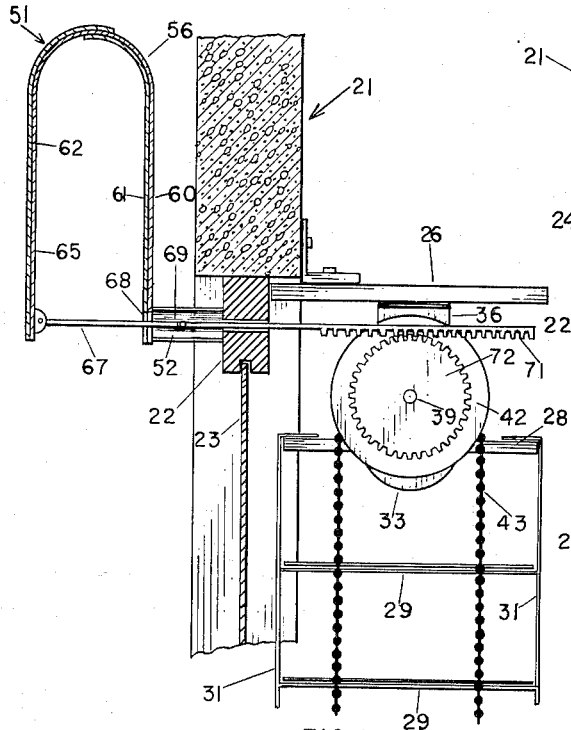
FIG. 1 is a fragmentary vertical sectional view of a direct drive form of actuator installed on a window, the plane of the section being indicated by the line 1—1 in FIG. 2.
Figure 2:
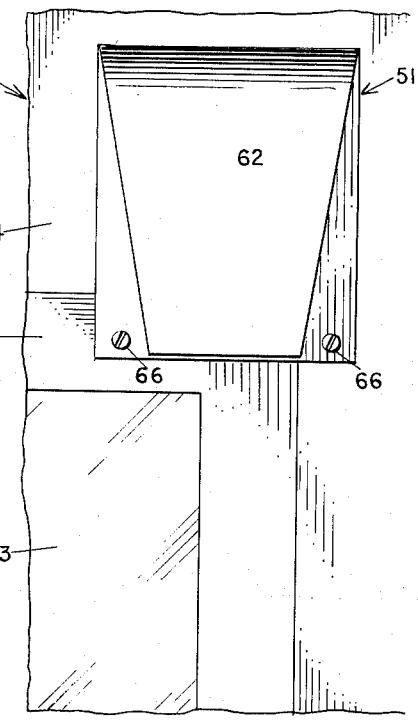
FIG. 2 is a fragmentary front elevational view of the FIG. 1 form of device showing the device installed on a window.
Figure 3:
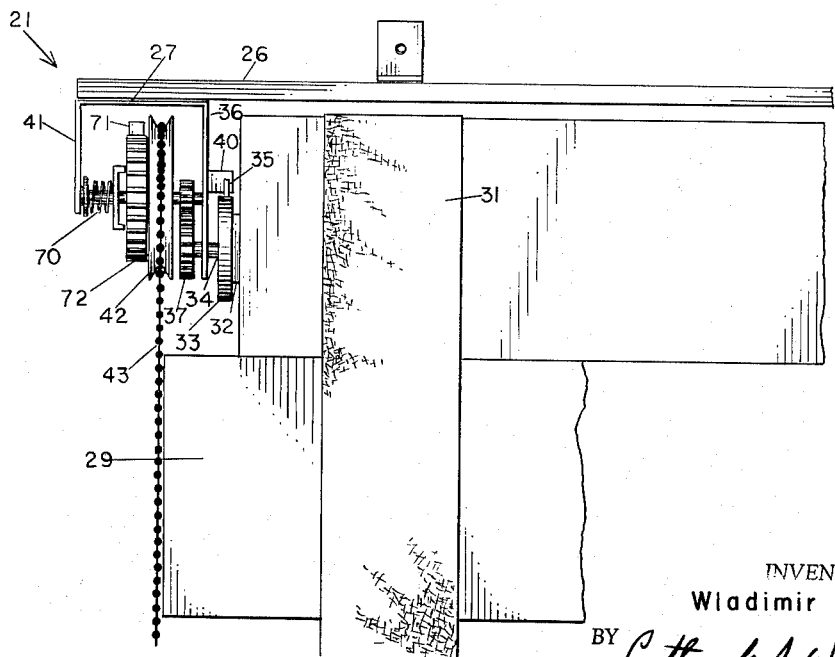
FIG. 3 is a fragmentary rear elevational view of the FIG. 1 form of device.

The direct drive or self-powered form of the device, shown most clearly in FIGS. 1–3, and generally designated by the reference numeral 21, is conveniently located adjacent one corner of the frame 22 of a window 23 or other opening disposed within the building structure 24.

Suspended below a top rail 26, as by a pair of brackets 27, one bracket at each end of the rail, is a conventional Venetian blind including a top board 28 connected to a plurality of parallel slats 29, all connected by a pair of flexible tapes 31.

Projecting from each end of the top board 28 is a boss 32 having mounted thereon a circular plate 33 from which extends a shaft 34 journaled in a depending arm 36 of the bracket 27. A limit stop 35 on the circular plate 33 abuts a flange 40 on the bracket and prevents excessive rotation in either direction. Mounted on the end of the shaft 34 is a gear 37 in toothed engagement with a small gear 38 mounted on a countershaft 39 journaled both in the depending bracket arm 36 and the depending arm 41.

Serving manually to rotate the countershaft 39, and thus the shaft 34, so as to effect tilting of the blind slats, is a pulley 42 mounted coaxially on the countershaft 39. The pulley 42 is of the kind widely used in Venetian blinds and includes a pair of pull cords 43 looped over the top of the pulley 42 in customary fashion.

While Venetian blinds have long served as effective window coverings, providing in closed position, both privacy and freedom from the sun's rays, it often happens that the occupants will forget to close the blinds during the day. This allows the radiant energy from the sun to fall on furniture or other articles within the structure, often resulting in bleaching these items or taking away color, particularly where the rays fall on fabrics of various kinds.

In order to close the blinds in dependence upon the incidence of sunlight, an inverted generally U-shaped, bimetallic plate 51 (see FIGS. 1 and 2) is mounted on a bracket 52 extending outwardly from the window frame 22.

As appears most clearly in FIGS. 1, 4, 5 and 6, the bimetallic plate 51 includes a continuous, uninterrupted, inverted U-shaped plate 56 of a first metal having a predetermined coefficient of expansion. Secured to the continuous plate 56, in face to face engagement therewith, is a pair of opposed metallic plates, one, termed an inner plate 61, and the other, termed an outer plate 62. The plates 61 and 62 are of material having a coefficient of expansion different from that of the continuous plate 56.

The inner leg of the U-shaped plate 56 comprises the left hand portion (FIG. 1) 60 of the continuous plate 56 and the attached plate 61, the combination of these plates being secured to the bracket 52 as by fastenings 66. The outer leg, comprising the right hand portion 65 of the continuous plate 56 and the attached plate 62, is pivotally mounted adjacent its lower end to a push rod 67 extending through an opening 68 in the left hand leg of the bimetallic plate, and through a channel 69 in the bracket 52.

Pivotally mounted on the inner end of the push rod 67 is a rack 71 in engagement with a pinion 72 disposed coaxially on the countershaft 39, the pinion 72 being in tight frictional engagement with the pulley 42 by reason of a clutch spring 70 (see FIG. 3).

The outermost face of the outer plate 62 is painted black. Thus, as the sun's radiant energy strikes the black painted plate 62, heat is absorbed by the plate 62 and the plate 62 and the underlying plate 65 are both heated by conduction. The differing coefficients of expansion cause the outer portion of the U-shaped plate to swing outwardly from the vertical attitude shown in FIG. 1 to the inclined attitude shown in FIG. 4. The slight overlap of the interrupted plates 61 and 62 adjacent the top of the U results in the various configurations shown under the conditions now to be described.

FIG. 1 illustrates the bimetallic actuating element 51 in a situation wherein the ambient or atmospheric temperature is approximately average or normal and there is no sunlight.

FIG. 4 illustrates the posture of the elements at or near normal ambient temperature but with sunlight incident upon the black painted outer plate 62.

FIG. 5 shows the configuration of the plate when the atmospheric temperature is cold, or below average, and without any sunlight falling on the plate 62.

FIG. 6 indicates the situation wherein there is no sunlight, yet the ambient temperature is hot, or above average.

The deduction made from these results is that where there is no sun, the distance between the bottom legs of the actuator 51 is constant, regardless of the ambient temperature.

Where, however, sunlight impinges on the plate 62, the right hand plate combination 62 and 65, i.e., the right hand leg of the actuator, swings outwardly relative to the left hand leg.

The result of this relative movement is that the push rod 67 and the rack are urged toward the right (see FIG. 1), thus rotating the pinion 72 and the countershaft 39 in a clockwise direction. Through the gear train heretofore described, the slats 29 are tilted from the substantially open position shown in FIG. 1 to the closed position indicated in FIG. 3.

While the clutch spring 70, interposed between the pinion 72 and the bracket leg 41 urges the pinion tightly against the pulley 42, thus transmitting rotation of the pinion 72 to the pulley 42, and thus to the countershaft 39, it can be seen that manual operation or movement of the pull chain 43 will cause the pulley 42 and the countershaft 39 to rotate in the desired direction, regardless of the position of the actuator and the rack and pinion. In other words, manual operation will over-ride the sunlight actuated member, the face of the pinion slipping over the pulley face since the urgency of the spring 70 is overcome.

Although the bimetallic actuator 51 need not be particularly large to furnish the energy and displacement necessary to actuate the mechanical form of device illustrated in FIGS. 1–3, it has been found that a considerably more compact type of actuator or actuator-switch can be utilized where electrical energy is employed to effect tilting of the slats.

This latter form of device is illustrated in FIGS. 7–15.

As appears most clearly in FIG. 7, a bimetallic actuator 81 of the kind heretofore described is mounted on a bracket 82, mounted on a window frame 83, the actuator being somewhat inclined to present a perpendicular face to the direction of the average rays of sunlight throughout the year in the latitude involved.

Extending through an opening in the frame 83 from the free or distal end 84 of the actuator is an articulated rod 86 serving to transmit the outward and inward swinging movement of the actuator into translational movement of a connector slug 87 to which the rod 86 is attached.

The connector slug 87 includes a pair of conductors 88 and 89 disposed within a non-conducting body 91. The opposite ends of each of the conductors 88 and 89 terminate in outwardly projecting contact points, 88a and 88b, 89a and 89b, respectively.

In turn, connecting the conductors 88 and 89 to an electrical energy source 93, and electric motor 94 are lines 88c and 89c, respectively.

The slug 87 is slidably supported on a non-conducting base member 96 (see FIGS. 12 and 13) from which depends a cleat 97. Within the base 96 is a cross-disposed but separated pair of conductors 98 and 99, these conductors terminating at their opposite ends in upstanding contact plates 98a and 98b, and 99a and 99b, respectively.

A housing 101, suspended from the top rail 102 of a Venetian blind assembly, covers and supports the slug 87 and the slidable base 96, a pair of tracks 103 adjacent the bottom of the housing serving to support the base 96, the base being slidably disposed within the tracks.

An opening 104 in the side of the housing allows the conductors 88c and 89c to pass through the housing en route to the motor 94 and to the battery 93.

FIG. 7 is illustrative of the actuator 81 in a night-time situation, the slats 111 of the Venetian blind being in an open or horizontal attitude. In this condition, it will be assumed that the slug 87 is in a central or neutral position, contacting none of the upstanding contact plates.

Figure 11:
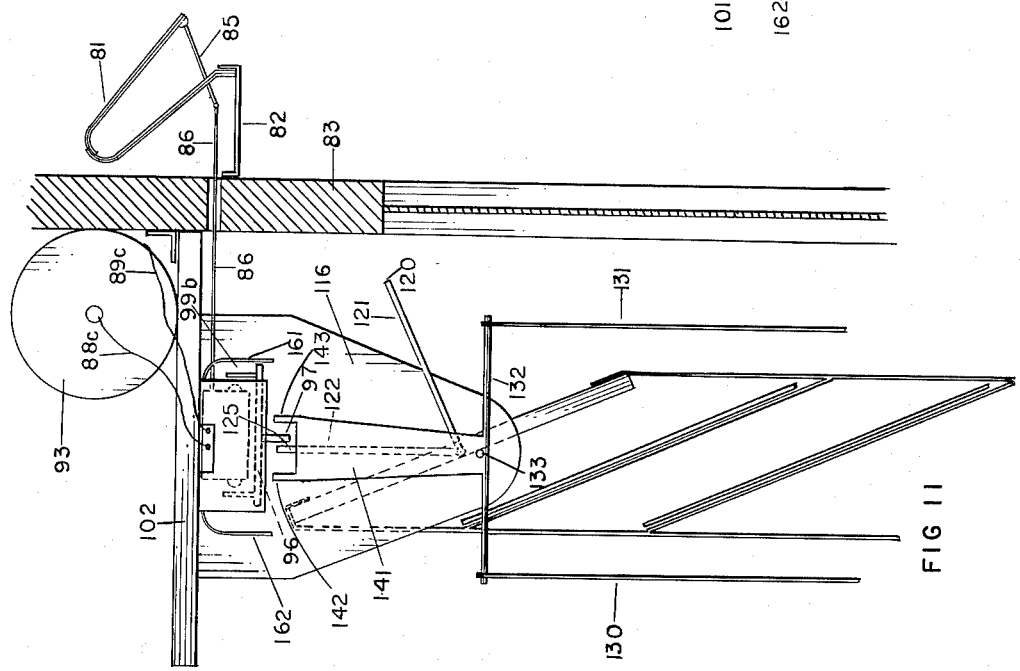
FIG. 11 is a view showing the slats in tilted, or closed, position preparatory to manual opening.

As the sun rises and the sun's radiant energy impinges on the black painted outer plate, separation of the two legs of the inverted U-shaped, bi-metallic member occurs, as appears in FIGS. 11 and 14. This movement of the actuator plate and the rod 86 toward the right translates the slug 87 and, more particularly, urges the contact points 88b and 89b on the slug against the right-hand, upstanding contact plates 99b and 98b, respectively on the base 96. This action completes the circuit which includes the conductors 88c and 89b, as well as the motor 94 and the battery 93, causing the electrical motor 94 to rotate in a direction such as to tilt the Venetian blind slats into their closed position.

Tilting of the slats 111 is effected by rotation of the electric motor 94 mounted on and connected to a gear box 116 containing conventional gears (not shown) and serving to rotate a shaft 117 extending from the top board 118 to which the slats 111 are attached by the tape 119.

As the slats 111 are tilted by the motor and the shaft 117 from the horizontal attitude shown in FIG. 7 to the inclined position appearing in FIG. 11, a pair of rocker arms 121 and 122 mounted on and projecting radially from the shaft 117 are concurrently swung from the position indicated in FIG. 7 to that shown in FIG. 11. The outer ends of the rocker arms 121 and 122 are bent outwardly at right angles to form projections 120 and 125 (see FIG. 9).

There is a lost motion relationship between the slug 87 and the slidable base member 96. That is, the longitudinal distance between the pair of contact plates 98a, 99a and the opposite pair of contact plates 98b, 99b exceeds the overall length of the slug and the slug's slightly projecting contact points. Consequently, as the slug 87 is urged toward the right (see FIG. 7) by the spreading of the actuator, the slug moves a short distance to the right before the contact points on the right-hand end of the slug 87 are urged into contact with the adjacent, upstanding, contact plates on the base 96. This means that the motor 94 is actuated before the cleat 97 depending from the base 96 interferes with the juxtaposed bent end of the rocker arm 121.

The dimensions and proportions of the parts are such, in other words, that as the slug contact points 88b and 89b abut the base's contact plates 99b and 98b, respectively, the rocker arm 121 immediately commences to be swung in a clockwise direction by the motor. If, then, the spreading of the actuator and the attendant urgency of the slug 87 against the right-hand contact plates of the base tends to urge the base slightly more toward the right (see FIGS. 7 and 11), the bent portion 120 of the rocker arm, having already moved away, does not interfere with movement of the cleat 97. This allows a slight additional movement of the base to the right if required by the actuator plate.

Once the motor starts tilting the slats, and commences swinging the rocker arms 121 and 122, these movements continue until the bent portion 125 (see FIG. 9) of the rocker arm 122 swings into abutment with the cleat 97 depending from the slidable base 96. The instant the rocker arm 122 urges the cleat 97 and the base 96 toward the right, contact is broken between the contact plates on the base 96 and the adjacent contact points on the slug 87 since the slug remains stationary while the base is urged away from the slug (see FIG. 11). This breaking of the contact causes the motor to stop, with the slats having assumed the tilted position shown in FIG. 11.

The slats 111 stay in tilted position shown in FIG. 11 until sunlight no longer falls on the actuator. At this juncture, the bimetallic plates return to the initial, parallel-plate situation shown in FIG. 7. This return of the actuator to initial position urges the slug 87 toward the left and the slug's contact points 88a and 89a are urged into abutment with the corresponding contact plates 98a and 99a of the slidable base 96. Owing to the crossing arrangement of the connecting wires 98 and 99 within the base (the wires 98 and 99 each being insulated from the other, however), the motor 94, being reversible, rotates in the opposite direction to that set forth above and rotates the slats from the closed attitude shown in FIG. 11 to the open position shown in FIG. 7.

In a manner comparable to but is a direction opposite to that previously described, the rocker arms 121 and 122 also swing as the slats are opened. As soon as the end 120 of the rocker arm 121 abuts the cleat 97, the slidable base 96 is pushed slightly to the left of the slug (see FIG. 7), breaking the contact with the slug and causing the motor to stop.

It can therefore be seen that in the embodiment just described, the bimetallic actuator plate structure serves as a trigger which acts in both directions to actuate a lost motion type of electrical-mechanical switch. The Venetian blind slats can be considered as a work mechanism or unit which is acted upon. Suitable appendages on the blind serve, upon attaining proper posture, to deactivate the the switch; thus the structure acts in the nature of feed-back device.

Provision is also made in the electrified form of actuator shown in FIGS. 7–15 for a manually operated override structure.

Figures 9, 10:
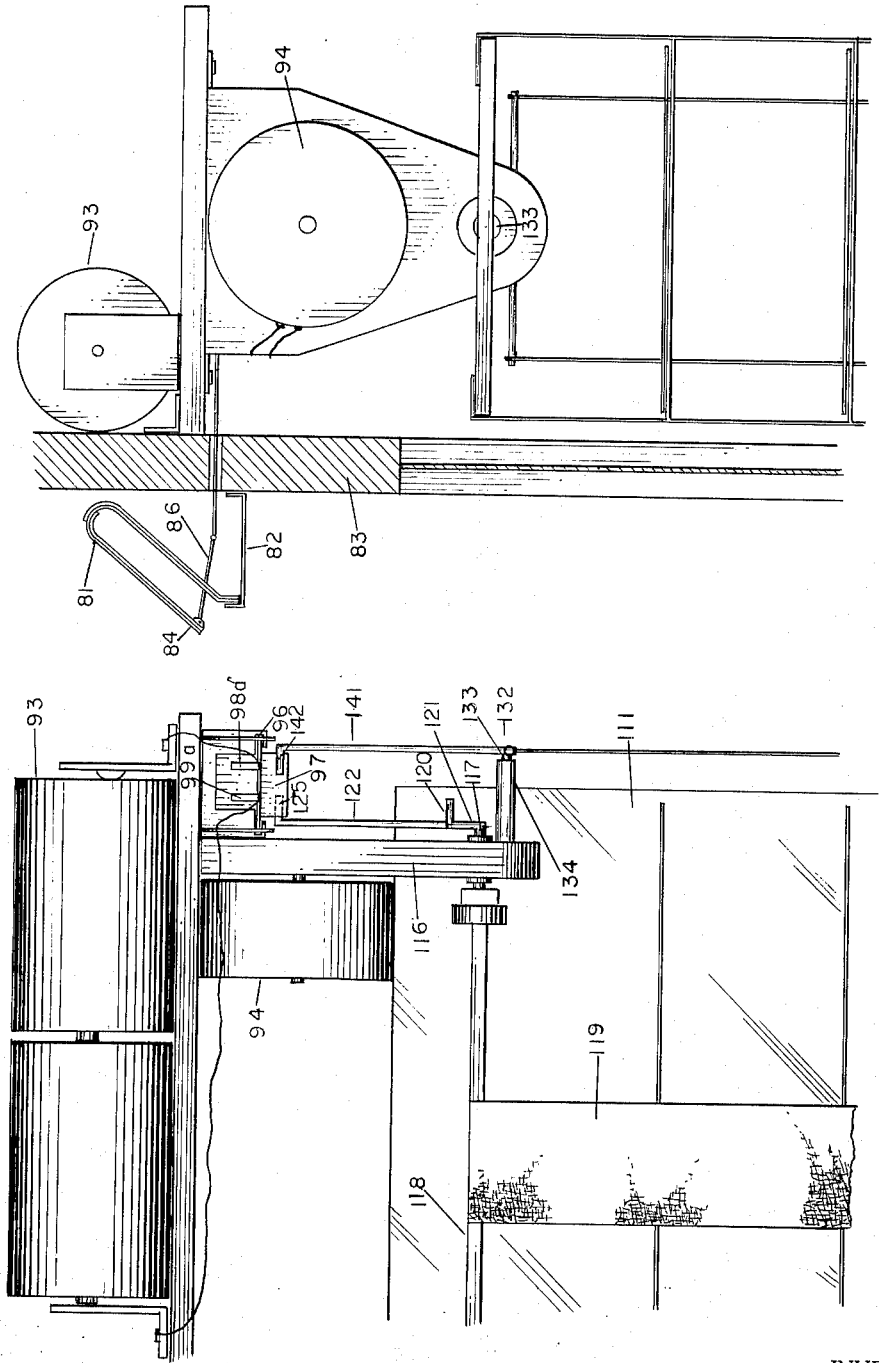
FIG. 9 is a fragmentary rear elevational view of the FIG. 7 form of device.
FIG. 10 is a fragmentary sectional view, the plane of the section being indicated by the line 10—10 in FIG. 9.
Figure 12:
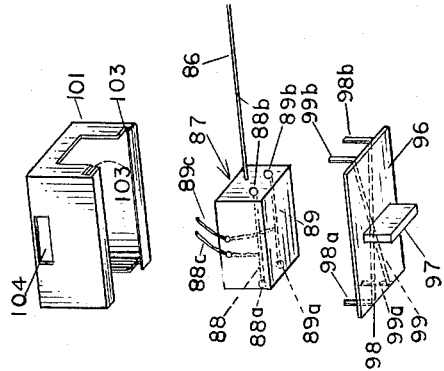
FIG. 12 is an exploded perspective view of the reversible switching mechanism to a somewhat enlarged scale.
Figure 13:
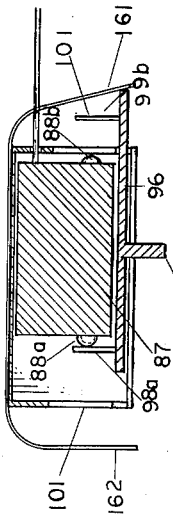
FIG. 13 is a sectional view, to an enlarged scale of the reversible switching mechanism.

Particularly referring to the situation appearing in FIGS. 9 and 11 wherein the blinds are closed as a result of sunlight falling on the actuator plates, let it be assumed that the occupant desires to open the blinds. This result can be accomplished by manually pulling downwardly on the right-hand one 131 of a pair of cords 130 and 131 fastened at the ends of a cross-bar 132 mounted on a pin 133 journaled in a bearing 134 secured to the lower end of the gear box 116 (see FIG. 9).

Also mounted on and being rotatable with the pin 133 is a radially disposed and upstanding fork 141 terminating in a pair of tines 142 and 143 bent inwardly (see FIG. 9) into interfering relation with the movement of the cleat 97 depending from the slidable base 96.

Referring especially to FIG. 14, it can be seen that as the pull cord 131 is urged downwardly, the tine 142 is swung in a clock-wise direction and pushes the cleat 97 and the slidable base 96 toward the right. In fact, the pulling of the cord 131 slides the base 96 so far toward the right that the left-hand contact plates 98a and 99a, upstanding from the base 96, abut the corresponding left-hand contact points 88a and 89a, respectively, on the slug. As previously described, this contact causes the motor to tilt the slats into the open position shown in FIGS. 7 and 14. FIG. 14, in other words, shows the position of the slats after the fork is tilted as shown in FIG. 14.

The operator holds the cord 131 down until the desired degree of tilt is achieved. Then, the cord 131 is released. After the cord is released, the right hand one 161 of a pair of leaf springs 161 and 162, mounted on and depending from the top board 102, springs back to its initial vertical attitude and thereby pushes the slidable base 96 toward the left (see FIGS. 14 and 11 for the sequence) and thus breaks contact with the slug, causing the motor to stop. In other words, the leaf spring 161 is resiliently deformed owing to its abutment with the right-hand end of the slidable base 96, the base 96, in turn, being urged to the right by the tine 142 rocked clockwise by the pulling of the cord 131. As soon as the cord 131 is released, the spring 161 urges the base 96 and the cleat 97 toward the left, thus returning the tines to their initial central position while, at the same time, the motor contact is broken, as explained above.

If, at this juncture, the occupant again desires to reverse or close the blinds, it is only necessary to pull downwardly on the left-hand pull cord 130. So, also if in the night-time, blind-open, situation shown in FIG. 7 it is desired to close the blinds, a pull on the cord 130 will produce the desired results. With reference to FIG. 15, it can be seen that pulling downwardly on the left-hand cord 130 swings the tine 143 against the cleat 97 and slides the base 96 toward the left so that the right-hand contact plates 99b and 98b of the base are urged into contact with the corresponding right-hand contact points 88b and 89b on the slug 87. The contacts being made, the motor 94 rotates in a direction such as to close the blinds, i.e. to tilt the slats to the position shown in FIGS. 11 and 15.

As explained before, manually pulling downwardly on a cord causes the slider 96, or base member, to bias outwardly the respective leaf spring. Thus, in the FIG. 15 situation, the left-hand leaf spring 162 is biased outwardly until such time as the cord is released. Upon release of the cord, the resiliency of the spring 162 returns the slidable base 96, the cleat 97 and the fork 141 to their mid or neutral position, as appears in FIGS. 7 and 11; and, concurrently, the spring 162 pushes the base's contact plates away from the adjacent contact points on the slug. It is to be noted that the position of the slug remains substantially fixed except for the movement of which it partakes between the hours of daylight and dark, and vice versa.

It is, in other words, the relative position and movement between the slug and the slider which determines the on or off condition and the direction of rotation of the motor. These factors, in turn, are established by the condition of the bimetallic actuator plates, the attitude of the work (and attendant feed-back elements which at a predetermined juncture break the contacts) together with the manual over-ride structure which is operative regardless of the condition of the actuator plates.

It will be recognized that while the forms of device herein embodied are utilized in an environment of Venetian blinds, similar results can readily be obtained with respect to other coverings, such as draw drapes, with suitable modification and relocation of the components. It is also to be noted that while battery power is shown, any other suitable electrical energy source can be used.

It can therefore be seen that I have provided a highly versatile, economical and reliable window covering actuator.

What is claimed is:

1. A Venetian blind slat actuating device comprising:
  (a) a stationary framework adjacent a window;
  (b) an electrical power source on said framework;
  (c) a reversible electric motor connected to said power source operative to rotate a slat;
  (d) a reversible switching mechanism connected to said power source and said motor, said mechanism including a first member slidably mounted on said framework and a second member slidably mounted on said framework, said first and second members being relatively movable and including a plurality of registering electrical contact elements movable into and out of contact in dependence upon the relative positions of said first and second members;
  (e) radiant energy responsive means for moving said first member relative to said second member to effect contact between said contact elements; and,
  (f) means mounted on a slat and movable therewith for moving said second member relative to said first member to effect separation of said contact elements.

2. The device of claim 1 wherein said reversible switching mechanism includes a pair of cross-disposed wires located on one of said members whereby contact between said first and second members at one end of said pair of wires effects a polarity opposite to that at the other end of said pair of wires.

3. The device of claim 1 wherein said first and second members are proportioned to effect a lost motion therebetween whereby all of said contacts on said first member are separable from all of said registering contacts on said second member.

4. The device of claim 1 further characterized by means for manually over-riding the operation of said motor and said switching mechanism.

5. The device of claim 4 wherein said over-riding means includes a fork having a pair of tines rockably mounted on said framework and including manually operable means for selectively urging said tines against one of said switching members for selective movement thereof relative to the other of said members.

References Cited by the Examiner

UNITED STATES PATENTS

| | | | |
|---|---|---|---|
| 1,425,665 | 8/22 | Lincoln | 60—23 X |
| 2,117,529 | 5/38 | Wile et al. | 189—62 X |
| 2,489,879 | 11/49 | Grebe | 160—6 X |
| 2,630,537 | 3/53 | Wiegman et al. | 160—6 X |
| 2,743,574 | 5/56 | McCarkle | 60—23 |
| 2,749,581 | 6/56 | McCormick | 20—62 |
| 2,857,634 | 10/58 | Garbade et al. | 20—62 |
| 2,917,795 | 12/59 | Brown | 20—62 |
| 2,960,606 | 11/60 | Berger | 60—23 X |
| 2,980,970 | 4/61 | Dickinson | 20—62 |
| 3,012,294 | 12/61 | Waldor | 20—62 |
| 3,064,131 | 11/62 | Brown | 160—5 X |

HARRISON R. MOSELEY, *Primary Examiner.*